(12) United States Patent
Malladi et al.

(10) Patent No.: US 11,474,826 B1
(45) Date of Patent: Oct. 18, 2022

(54) BOOT IMAGE FILE HAVING A GLOBAL PARTITION FOR DATA PROCESSING ENGINES OF A PROGRAMMABLE DEVICE

(71) Applicant: Xilinx, Inc., San Jose, CA (US)

(72) Inventors: Prashant Malladi, Hyderabad (IN); Sadanand Mutyala, Hyderabad (IN)

(73) Assignee: XILINX, INC., San Jose, CA (US)

(*) Notice: Subject to any disclaimer, the term of this patent is extended or adjusted under 35 U.S.C. 154(b) by 707 days.

(21) Appl. No.: 16/388,796

(22) Filed: Apr. 18, 2019

(51) Int. Cl.
*G06F 9/4401* (2018.01)
*G06F 8/41* (2018.01)
*G06F 15/78* (2006.01)
*G06F 15/80* (2006.01)

(52) U.S. Cl.
CPC .......... *G06F 9/4401* (2013.01); *G06F 8/41* (2013.01); *G06F 15/7807* (2013.01); *G06F 15/8023* (2013.01)

(58) Field of Classification Search
CPC ......... G06F 9/4401; G06F 8/41; G06F 5/7807
See application file for complete search history.

(56) References Cited

U.S. PATENT DOCUMENTS

| | | | | |
|---|---|---|---|---|
| 10,673,439 B1* | 6/2020 | Ahmad | ............ | H03K 19/17748 |
| 10,783,295 B1* | 9/2020 | Dong | ...................... | G06F 30/34 |
| 10,853,541 B1* | 12/2020 | Joshi | ...................... | G06F 30/331 |
| 2017/0220499 A1 | 8/2017 | Gray | | |
| 2019/0096813 A1* | 3/2019 | Lesea | ...................... | G06F 13/40 |
| 2019/0196901 A1* | 6/2019 | Arbel | .................. | G06F 15/7825 |

OTHER PUBLICATIONS

Xilinx, Inc., Bootgen User Guide, UG1283 (v2018.2), Sep. 2018, San Jose, CA USA.

* cited by examiner

*Primary Examiner* — Raymond N Phan
(74) *Attorney, Agent, or Firm* — Patterson + Sheridan, LLP

(57) ABSTRACT

Some examples described herein relate to a boot image file. In an example, a design system includes a processor and a memory, storing instruction code, coupled to the processor. The processor is configured to execute the instruction code to compile an application to generate a boot image file. The boot image file is capable of being loaded onto and executed by a programmable device that comprises data processing engines (DPEs). The boot image file has a format comprising a platform loader and manager (PLM) and partitions. The PLM comprises code capable of being executed by a controller of the programmable device to load the partitions onto the programmable device. Each of the partitions comprises a bitstream, executable code, data, or a combination thereof. The partitions collectively include a single global partition that comprises DPE partitions that are capable of being loaded onto one or more of the DPEs.

20 Claims, 9 Drawing Sheets

BOOT IMAGE FILE HAVING A GLOBAL PARTITION FOR DATA PROCESSING ENGINES OF A PROGRAMMABLE DEVICE

TECHNICAL FIELD

This disclosure relates to a boot image file for a programmable integrated circuit (IC) and, more particularly, to a boot image file for a programmable IC having an array of data processing engines (DPEs).

BACKGROUND

A programmable integrated circuit (IC) refers to a type of IC that includes programmable circuitry. An example of a programmable IC is a field programmable gate array (FPGA). An FPGA is characterized by the inclusion of programmable circuit blocks. Circuit designs may be physically implemented within the programmable circuitry of a programmable IC by loading configuration data, sometimes referred to as a configuration bitstream, into the device. The configuration data may be loaded into internal configuration memory cells of the device. The collective states of the individual configuration memory cells determine the functionality of the programmable IC. For example, the particular operations performed by the various programmable circuit blocks and the connectivity between the programmable circuit blocks of the programmable IC are defined by the collective states of the configuration memory cells once loaded with the configuration data.

Circuit designs could be created by generating circuits using primitives and/or writing hardware description language (HDL) code. Configuration data is then generated from the primitives and/or HDL, including placing logic and routing between the placed logic. Various verification and validation methods could be implemented to ensure the proper functioning of the circuit design.

SUMMARY

Some examples described herein relate to a boot image file. Some examples include generating a boot image file that is capable of being loaded onto and executed by a programmable integrated circuit (IC) that includes a plurality of data processing engines (DPEs), among other possible subsystems. Some examples include loading a boot image file to run on a programmable IC that includes a plurality of DPEs. The boot image file can have a format that can result in a smaller file and can result in reduced boot time of the programmable IC.

In an example, a design system includes a processor and a memory coupled to the processor. The memory stores instruction code. The processor is configured to execute the instruction code to compile an application to generate a boot image file. The boot image file is capable of being loaded onto and executed by a programmable device. The programmable device comprises data processing engines (DPEs). The boot image file has a format comprising a platform loader and manager and partitions. The platform loader and manager comprises executable code capable of being executed by a controller of the programmable device. Each of the partitions comprises a bitstream, executable code, data, or a combination thereof to be loaded onto the programmable device. The partitions collectively include a single global partition. The single global partition comprises DPE partitions. The DPE partitions are capable of being loaded onto one or more of the DPEs of the programmable device. The controller by execution of the platform loader and manager is capable of loading the partitions onto the programmable device.

An example is a method for operating a programmable device. Partitions of a boot image file are loaded onto the programmable device. The programmable device comprises data processing engines (DPEs). Each of the partitions of the boot image file comprises a bitstream, executable code, data, or a combination thereof. The partitions collectively include a single global partition. The single global partition comprises DPE partitions. The DPE partitions are loaded onto one or more of the DPEs of the programmable device.

In an example, a non-transitory storage medium comprises a boot image file capable of being loaded onto and executed by a programmable device. The programmable device comprises data processing engines (DPEs). The boot image file comprises a platform loader and manager and partitions. The platform loader and manager comprises executable code capable of being executed by a controller of the programmable device. Each of the partitions comprises a bitstream, executable code, data, or a combination thereof to be loaded onto the programmable device. The partitions collectively include a single global partition. The single global partition comprises DPE partitions. The DPE partitions are capable of being loaded onto one or more of the DPEs of the programmable device. The controller by execution of the platform loader and manager is capable of loading the partitions onto the programmable device.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
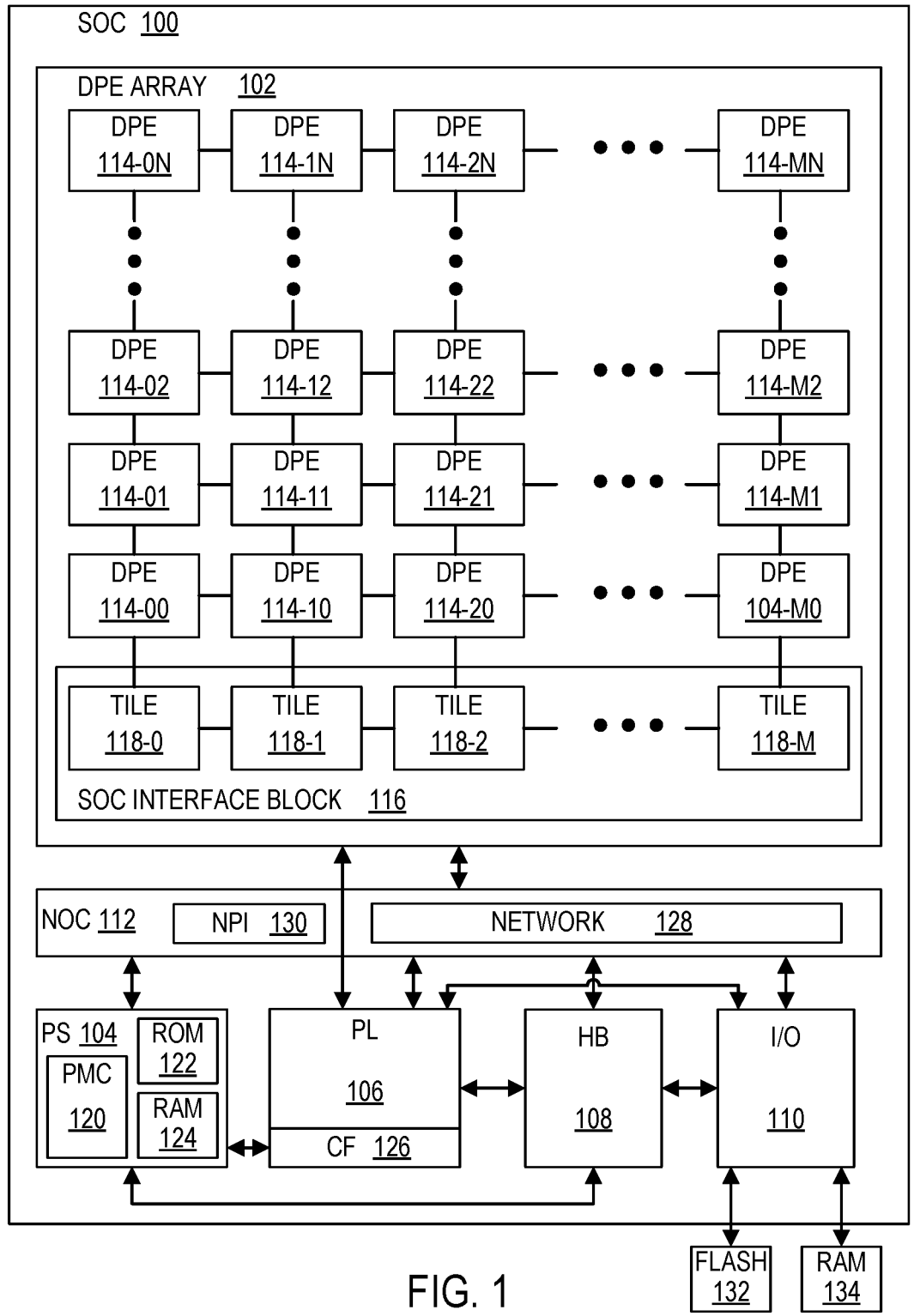
FIG. 1 depicts an architecture for a System-on-Chip (SoC) according to some examples.

Some examples described herein relate to a boot image file. A boot image file can include multiple partitions of Executable and Linkable Format (ELF) files that are to be loaded into various subsystems of a programmable device. In examples described herein, a programmable device is or includes a programmable integrated circuit (IC). In some examples, a subsystem of the programmable device includes a data processing engine (DPE) array. A DPE array may include a plurality of DPEs. In general, a DPE can include a hardened core that is capable of providing data processing capabilities and a memory module that is accessible by the core. Any individual DPE can have an associated ELF file in the boot image file that is segmented into multiple DPE partitions. In some examples, the boot image file includes a single global partition that includes the DPE partitions of the DPEs. By having a single global partition, overhead can be reduced in the boot image file, which can further result in lower boot times when loading the boot image file on the target programmable device. Other examples relate to generating (e.g., by compiling) a boot image file and/or loading a boot image file to run on a programmable device.

Some examples described herein are described in the context of a heterogeneous data processing architecture of a programmable IC. More specifically, for example, the architecture described below includes (i) programmable logic regions (e.g., fabric of an FPGA) that are capable of being configured to process data, (ii) a processing system, and (iii) DPEs, each with a core, that are also capable of being programmed to process data. Some examples can be extended to homogeneous data processing architectures, such as, for example, multi-core processors (e.g., without programmable logic regions). Such multi-core processors can have a large number of resources available for executing an application and can benefit from aspects of examples described herein.

An application can be compiled and assembled in a boot image file for execution by a heterogeneous data processing architecture such as described herein, e.g., including one or more programmable logic regions, a processing system, and a DPE array. The boot image file can be formatted to include multiple partitions. For example, different partitions may be directed to different subsystems of the programmable IC and/or different ELF files for the different subsystems. Further, each ELF file may be segmented into multiple partitions where, e.g., different partitions are to be loaded to non-contiguous memory address ranges. As described below, a DPE can include program memory in a core, and the core of the DPE can access memory banks in that DPE and in neighboring DPEs (e.g., totaling four memory banks that may be accessed by the core). In such examples, an ELF file for the DPE can include respective partitions to be loaded into the program memory and the four memory banks. More partitions may be implemented if, e.g., non-contiguous memory is implemented in the program memory and/or any memory bank, and/or fewer partitions may be implemented if, e.g., fewer memory banks are to be accessed during execution of the ELF file. The compiling of the application can determine and generate partitions based on where the ELF files are to be loaded and executed on the programmable IC.

In some examples, a boot image file includes first-level partitions and embedded partitions within a global first-level partition. Each first-level partition of the boot image file is or includes at least a portion of an ELF file including a bitstream, executable code, configuration data, and/or application data for a contiguous memory address range of a given subsystem, except that a single global first-level partition in the boot image file includes DPE embedded partitions of ELF files for DPEs. Each first-level partition has some associated overhead in the boot image file. For example, each first-level partition can have an associated authentication certificate and/or a source location of an encryption key (which can indicate whether the partition is encrypted). By including the DPE embedded partitions within a single global first-level partition, the DPE embedded partitions can have or share the overhead of the single global first-level partition to reduce the overhead of the boot image file (e.g., compared to if the DPE partitions are first-level partitions each having an associated overhead). By reducing overhead, boot time can be decreased because less data in the overhead is read and processed. Additionally, authenticating DPE embedded partitions with a single authentication certificate can reduce processing to authenticate each of the DPE partitions, which can further reduce boot time.

Due to the novelty of the heterogeneous data processing architecture described herein, no processor-based system (e.g., a computer) was available for compiling an application to be executed on a programmable IC having the heterogeneous data processing architecture. Accordingly, a technical problem existed in that no processor-based system was available to compile an application to be executed by a programmable IC having the heterogeneous data processing architecture. Further, a technical problem existed in that no processor-based system was available to generate a boot image file based on an application for execution by the programmable IC. Some examples provide a solution to this problem by providing a compiler in a processor-based system that is capable of compiling an application to generate a boot image file for execution by a programmable IC.

Techniques and processor-based systems for generating a boot image file for a programmable logic device (e.g., an FPGA) have been implemented previously. Additionally, techniques for loading a boot image file in such programmable logic devices have been implemented previously. However, these techniques for loading a boot image file have proven to be problematic when translating and modifying them to a programmable IC having, e.g., a DPE array as described herein. An architecture described herein can be highly complex and large. The complexity and scale of the DPE array could cause a large number of partitions to be included in a boot image file. Allocating overhead to each partition like had previously been done for other architectures can cause the boot image file to be exceedingly large and cause boot times of the programmable IC having the DPE array to be large. Accordingly, a technical problem existed in that formats of previous boot image files resulted in large files and large boot times when being loaded onto a programmable IC having many DPEs. No processor-based system was available to generate a boot image file for such a programmable IC that was memory and boot time efficient. Additionally, no operation for efficiently loading a boot image file for such a programmable IC was available. Various examples provide solutions to these problems by implementing a format of a boot image file that has first-level partitions, where a single global first-level partition includes DPE embedded partitions that share overhead of the single global first-level partition. As stated previously, this approach can reduce overhead of the boot image file, which can reduce the size of the boot image file and reduce boot time of a programmable IC loading the boot image file.

Aspects of these and other examples are described below. Additional or other benefits may be achieved by various examples, as a person having ordinary skill in the art will readily understand upon reading this disclosure.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations. Even further, various directions or orientations are described as, e.g., a column and a row; horizontal and vertical; and bottom or below, top or above, left, and right. These designations are for ease of description, and other directions or orientations may be implemented.

FIG. 1 illustrates an architecture for a System-on-Chip (SoC) 100 according to some examples. The architecture can be modified with any number of variations, some of which may be identified in the following description.

The SoC 100 includes a plurality of subsystems, including a DPE array 102, a processing system (PS) 104, programmable logic (PL) 106, hard block circuits (HB) 108, input/output circuits (I/O) 110, and a Network-on-Chip (NoC) 112. In some examples, each sub-system includes at least some component or circuit that is programmable, such as described herein. In some examples, some of the subsystems can include a non-programmable application-specific circuit. Other circuits can be included in the SoC 100, such as other IP blocks like a system monitor or others.

The DPE array 102 includes a plurality of interconnected DPEs 114-00 through 114-MN (collectively or individually, DPE(s) 114). Each of the DPEs 114 is a hardwired circuit block and may be programmable. Each of the DPEs 114 can include the architecture as illustrated in and described below with respect to FIG. 2. In the example of FIG. 1, the DPE array 102 includes a two-dimensional array of DPEs 114 and an SoC interface block 116. The DPE array 102 may be implemented using any of a variety of different architectures. FIG. 1 illustrates DPEs 114 arranged in aligned rows and aligned columns. The DPE array 102 has M+1 columns of DPEs 114 and N+1 rows of DPEs 114. The reference numerals of the DPEs 114 in FIG. 1 indicate the positioning of each DPE 114 by the reference number "114-[column][row]." In some examples, DPEs 114 may be arranged where DPEs 114 in selected rows and/or columns are horizontally inverted or flipped relative to DPEs 114 in adjacent rows and/or columns. In other examples, rows and/or columns of DPEs 114 may be offset relative to adjacent rows and/or columns.

As described in more detail below, the DPEs 114 can communicate various data by different mechanisms within the DPE array 102. The DPEs 114 are connected to form a DPE interconnect network. To form the DPE interconnect network, each DPE 114 is connected to vertically neighboring DPE(s) 114 and horizontally neighboring DPE(s) 114. For example, DPE 114-11 is connected to vertically neighboring DPEs 114 within column 1, which are DPEs 114-10 and 114-12, and is connected to horizontally neighboring DPEs 114 within row 1, which are DPEs 114-01 and 114-21. DPEs 114 at a boundary of the DPE array 102 may be connected to fewer DPEs 114. The DPE interconnect network includes a stream network and a memory mapped network. The stream network includes interconnected stream switches, and application data and direct memory accesses (DMAs) may be communicated between the DPEs 114 via the stream network. The memory mapped network includes interconnected memory mapped switches, and configuration and control data can be communicated between the DPEs 114 via the memory mapped network. Neighboring DPEs 114 can further communicate via shared memory. An independent cascade stream can be implemented between DPEs 114.

The DPE array 102 further includes the SoC interface block 116 that includes tiles 118-0 through 118-M (collectively or individually, tile(s) 118). Each of the tiles 118 of the SoC interface block 116 may be hardwired and programmable. Each of the tiles 118 can include the architecture as illustrated in and described below with respect to FIG. 3. The SoC interface block 116 provides an interface between DPEs 114 of DPE array 102 and other subsystems of the SoC 100, such as the NoC 112 and the PL 106.

In some examples, the SoC interface block 116 is coupled to adjacent DPEs 114. For example, as illustrated in FIG. 1, the SoC interface block 116 may be connected to each DPE 114 in the bottom row of DPEs 114-x0 in the DPE array 102 (where "x" indicates a given column). More particularly, in FIG. 1, each tile 118 of the SoC interface block 116 is connected to a neighboring DPE 114 within the column of the DPE array 102 in which the respective tile 118 is disposed. In FIG. 1, tile 118-0 is connected to DPE 114-00; tile 118-1 is connected to DPE 114-10; tile 118-2 is connected to DPE 114-20; etc. Additionally, each tile 118 is connected to neighboring tiles 118. The SoC interface block 116 is capable of communicating data through the tiles 118, e.g., of propagating data from tile 118-0 to tile 118-1, from tile 118-1 to tile 118-2, etc., and vice versa. A tile 118 within the SoC interface block 116 can communicate with a DPE 114 to which the tile 118 is connected, and the communication can be routed through the DPE interconnect network formed by the interconnected DPEs 114 to a target DPE 114.

Each tile 118 can service a subset of DPEs 114 in the DPE array 102. In the example of FIG. 1, each tile 118 services the column of DPEs 114 above the respective tile 118. The tiles 118 also include stream switches, which are interconnected in the stream network to stream switches of the DPEs 114, and memory mapped switches, which are interconnected in the memory mapped network to memory mapped switches of the DPEs 114. Communications from DPEs 114 can be communicated with the tile 118 below the respective DPEs 114 via the interconnected stream switches and/or memory mapped switches. The tile 118 can provide an interface to the PL 106 and/or the NoC 112 for communications therewith.

The PS 104 may be or include any of a variety of different processor types and number of processor cores. For example, the PS 104 may be implemented as an individual processor, e.g., a single core capable of executing program instruction code. In another example, the PS 104 may be implemented as a multi-core processor. The PS 104 may be implemented using any of a variety of different types of architectures. Example architectures that may be used to implement the PS 104 may include an ARM processor architecture, an x86 processor architecture, a graphics processing unit (GPU) architecture, a mobile processor architecture, a digital signal processor (DSP) architecture, or other suitable architecture that is capable of executing computer-readable program instruction code.

The PS 104 includes a platform management controller (PMC) 120, which may be a processor and/or processor core in the PS 104 capable of executing program instruction code. The PS 104 includes read-only memory (ROM) 122 (e.g., programmable ROM (PROM) such as eFuses, or any other ROM) and random access memory (RAM) 124 (e.g., static RAM (SRAM) or any other RAM). The ROM 122 stores program instruction code that the PMC 120 is capable of executing in a boot sequence. As described in further detail below, the RAM 124 is capable of being written to (e.g., to store program instruction code) by the PMC 120 executing program instruction code from the ROM 122 during the boot sequence, and the PMC 120 is capable of executing program instruction code stored in the RAM 124 during later operations of the boot sequence.

The PL 106 is logic circuitry that may be programmed to perform specified functions. As an example, the PL 106 may be implemented as fabric of an FPGA. The PL 106 can include programmable logic elements including configurable logic blocks (CLBs), look-up tables (LUTs), random access memory blocks (BRAM), Ultra RAMs (URAMs), input/output blocks (IOBs), digital signal processing blocks (DSPs), clock managers, and/or delay lock loops (DLLs). In some architectures, the PL 106 includes columns of programmable logic elements, where each column includes a single type of programmable logic element (e.g., a column of CLBs, a column of BRAMs, etc.). The programmable logic elements can have one or more associated programmable interconnect elements. For example, in some architectures, the PL 106 includes a column of programmable interconnect elements associated with and neighboring each column of programmable logic elements. In such examples, each programmable interconnect element is connected to an associated programmable logic element in a neighboring column and is connected to neighboring programmable interconnect elements within the same column and the neighboring columns. The interconnected programmable interconnect elements can form a global routing network within the PL 106.

The PL 106 has an associated configuration frame interconnect (CF) 126. A configuration frame node residing on the PMC 120 is connected to the CF 126. The PMC 120 sends configuration data to the configuration frame node, and the configuration frame node formats the configuration data in frames and transmits the frames through the CF 126 to the programmable logic elements and programmable interconnect elements. The configuration data may then be loaded into internal configuration memory cells of the programmable logic elements and programmable interconnect elements that define how the programmable elements are configured and operate. Any number of different sections or regions of PL 106 may be implemented in the SoC 100.

In some examples, an authentication engine and an encryption/decryption engine are implemented in the PS 104 and/or PL 106. Implementing any of these engines can include executing program instruction code stored in ROM 122 by the PS 104 (e.g., by the PMC 120), implementing a hardwired circuit within the PS 104 and/or within the SoC 100, and/or implementing configuration data in the ROM 122 that is programmed to the PL 106, e.g., by the PMC 120 during a boot sequence. As described below, the authentication engine can authenticate authentication certificates prepended to partitions of a boot image file. In some examples, the authentication engine is a RSA engine. Similarly, the encryption/decryption engine can decrypt encrypted partitions of a boot image file. In some examples, the encryption/decryption engine is an advanced encryption standard (AES) engine.

The HB 108 can be or include memory controllers (such as double data rate (DDR) memory controllers, high bandwidth memory (HBM) memory controllers, or the like), peripheral component interconnect express (PCIe) blocks, Ethernet cores (such as a 100 Gbps (C=100) media address controller (CMAC), a multi-rate MAC (MRMAC), or the like), forward error correction (FEC) blocks, Analog-to-Digital Converters (ADC), Digital-to-Analog Converters (DAC), and/or any other hardened circuit. The I/O 110 can be implemented as eXtreme Performance Input/Output (XPIO), multi-gigabit transceivers (MGTs), or any other input/output blocks. Any of the HB 108 and/or I/O 110 can be programmable.

The NoC 112 includes a programmable network 128 and a NoC peripheral interconnect (NPI) 130. The programmable network 128 communicatively couples subsystems and any other circuits of the SoC 100 together. The programmable network 128 includes NoC packet switches and interconnect lines connecting the NoC packet switches. Each NoC packet switch performs switching of NoC packets in the programmable network 128. The programmable network 128 has interface circuits at the edges of the programmable network 128. The interface circuits include NoC master units (NMUs) and NoC slave units (NSUs). Each NMU is an ingress circuit that connects a master circuit to the programmable network 128, and each NSU is an egress circuit that connects the programmable network 128 to a slave endpoint circuit. NMUs are communicatively coupled to NSUs via the NoC packet switches and interconnect lines of the programmable network 128. The NoC packet switches are connected to each other and to the NMUs and NSUs through the interconnect lines to implement a plurality of physical channels in the programmable network 128. The NoC packet switches, NMUs, and NSUs include register blocks that determine the operation of the respective NoC packet switch, NMU, or NSU.

A physical channel can also have one or more virtual channels. The virtual channels can implement weights to prioritize various communications along any physical channel. The NoC packet switches also support multiple virtual channels per physical channel. The programmable network 128 includes end-to-end Quality-of-Service (QoS) features for controlling data-flows therein. In examples, the programmable network 128 first separates data-flows into designated traffic classes. Data-flows in the same traffic class can either share or have independent virtual or physical transmission paths. The QoS scheme applies multiple levels of priority across traffic classes. Within and across traffic classes, the programmable network 128 applies a weighted arbitration scheme to shape the traffic flows and provide bandwidth and latency that meets the user requirements.

The NPI 130 includes circuitry to write to register blocks that determine the functionality of the NMUs, NSUs, and NoC packet switches. The NPI 130 includes a peripheral interconnect coupled to the register blocks for programming thereof to set functionality. The register blocks in the NMUs, NSUs, and NoC packet switches of the programmable network 128 support interrupts, QoS, error handling and reporting, transaction control, power management, and address mapping control. The NPI 130 includes an NPI root node residing on the PMC 120, interconnected NPI switches connected to the NPI root node, and protocol blocks connected to the interconnected NPI switches and a corresponding register block.

To write to register blocks, a master circuit, such as the PMC 120, sends configuration data to the NPI root node, and the NPI root node packetizes the configuration data into a memory-mapped write request in a format implemented by the NPI 130. The NPI transmits the memory-mapped write request to interconnected NPI switches, which route the request to a protocol block connected to the register block to which the request is directed. The protocol block can then translate the memory-mapped transaction write request into a format implemented by the register block and transmit the translated request to the register block for writing the configuration data to the register block.

The NPI 130 may be used to program any programmable boundary circuit of the SoC 100. For example, the NPI 130 may be used to program any HB 108 and/or I/O 110 that is programmable.

Various subsystems and circuits of the SoC 100 are communicatively coupled by various communication mechanisms. Some subsystems or circuits can be directly connected to others. As illustrated the I/O 110 is directly connected to the HB 108 and PL 106, and the HB 108 is further directly connected to the PL 106 and the PS 104. The PL 106 is directly connected to the DPE array 102. The DPE array 102, PS 104, PL 106, HB 108, and I/O 110 are communicatively coupled together via the programmable network 128 of the NoC 112.

As will become apparent, DPEs 114 and tiles 118 may be programmed by loading configuration data into configuration registers that define operations of the DPEs 114 and tiles 118, by loading program instruction code into program memory for execution by the DPEs 114, and/or by loading application data into memory banks of the DPEs 114. The PMC 120 can transmit configuration data, program instruction code, and/or application data via the programmable network 128 of the NoC 112 to one or more tiles 118 in the SoC interface block 116 of the DPE array 102. At each tile 118 that receives configuration data, program instruction code, and/or application data, the configuration data, program instruction code, and/or application data received from the programmable network 128 is converted into a memory mapped transaction that is routed via the memory mapped network to a configuration register, program memory, and/or memory bank addressed by the memory mapped transaction (and hence, to a target DPE 114 or tile 118). The configuration data, program instruction code, and/or application data is written to the configuration register, program memory, and/or memory bank, respectively, by the memory mapped transaction.

Using a DPE array as described herein in combination with one or more other subsystems provides heterogeneous processing capabilities of the SoC 100. The SoC may have increased processing capabilities while keeping area usage and power consumption low. For example, the DPE array 102 may be used to hardware accelerate particular operations and/or to perform functions offloaded from one or more of the subsystems of the SoC 100. When used with a PS 104, for example, the DPE array 102 may be used as a hardware accelerator. The PS 104 may offload operations to be performed by the DPE array 102 or a portion thereof. In other examples, the DPE array 102 may be used to perform computationally resource intensive operations such as generating digital pre-distortion to be provided to analog/mixed signal circuitry.

In some examples, the SoC 100 can be communicatively coupled to other components. As illustrated, the SoC 100 is communicatively coupled to flash memory 132 and to RAM 134 (e.g., DDR dynamic RAM (DDRDRAM)). The flash memory 132 and RAM 134 may be separate chips and located, e.g., on a same board (e.g., evaluation board) as the SoC 100. The flash memory 132 and the RAM 134 are communicatively coupled to the I/O 110, which is connected to HB 108 (e.g., one or more memory controllers). The HB 108 is connected to the PS 104 (e.g., the PMC 120). The PMC 120 is capable of reading data from the flash memory 132 via the HB 108 and I/O 110, and writing the read data to local RAM 124 and/or, via the HB 108 and I/O 110, to the RAM 134.

Figure 2:
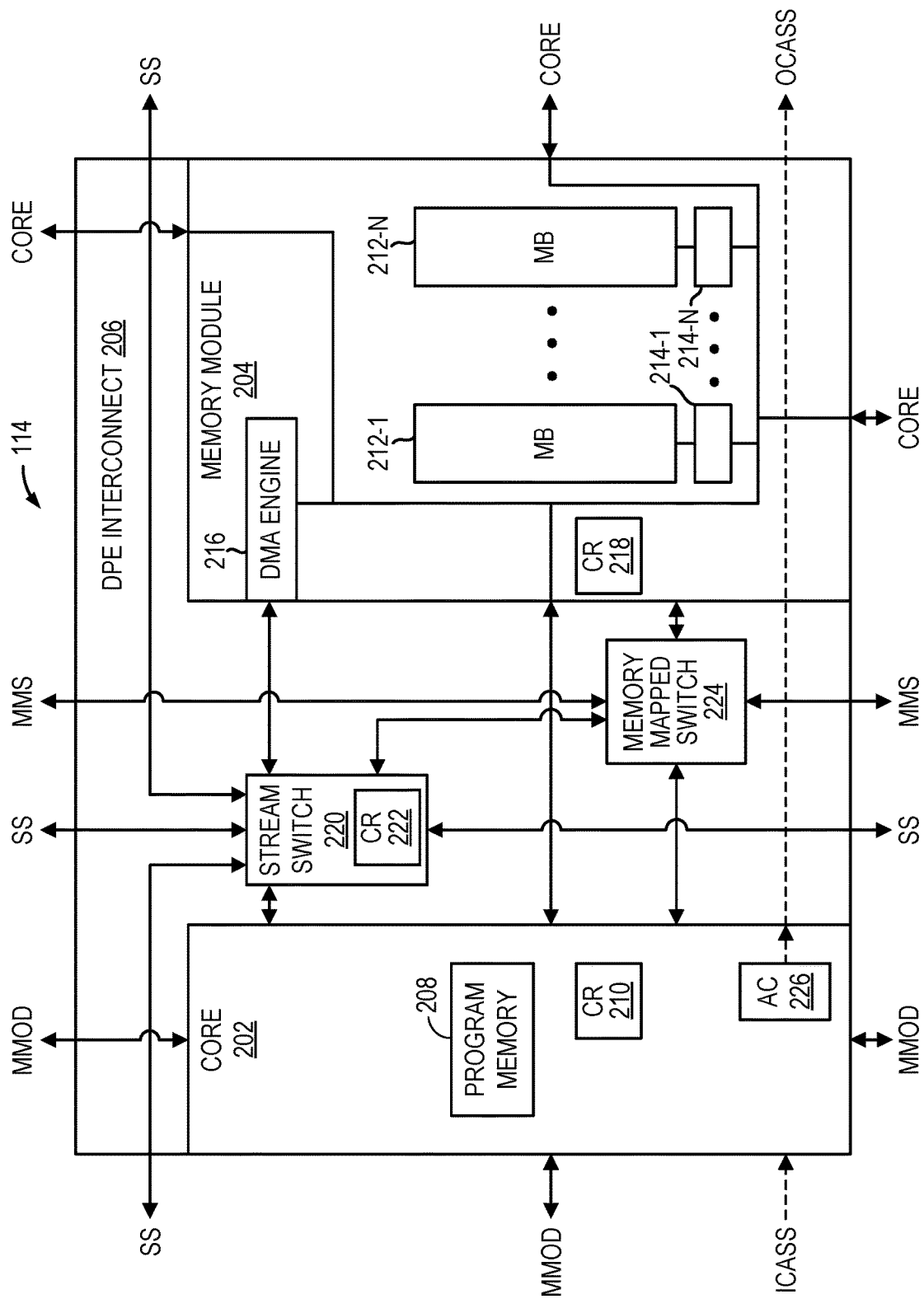
FIG. 2 depicts an architecture for a data processing engine (DPE) according to some examples.

FIG. 2 illustrates an architecture for a DPE 114 according to some examples. In the example of FIG. 2, DPE 114 includes a hardened core 202, a memory module 204, and DPE interconnect 206.

The core 202 provides data processing capabilities of the DPE 114. The core 202 may be implemented as any of a variety of different processing circuits. In some examples, the core 202 is implemented as a processor that is capable of executing program instruction code, e.g., computer readable program instruction code. Program memory 208 is included in the core 202 and is capable of storing program instruction code that is executed by the core 202. The core 202, for example, may be implemented as a CPU, a GPU, a DSP, a vector processor, or another type of processor that is capable of executing program instruction code. The core 202 may include configuration registers (CR) 210 that may be loaded with configuration data to control operation of core 202. In some examples, the core 202 may be activated and/or deactivated based upon configuration data loaded into the configuration registers 210.

The memory module 204 includes memory banks 212-1 to 212-N. The memory banks 212-1 to 212-N are capable of storing data that may be read and consumed by one or more core and data (e.g., results) that may be written by one or more core. In some examples, each memory bank 212 is single-ported thereby allowing up to one access to each memory bank each clock cycle. In other examples, each memory bank 212 is dual-ported or multi-ported thereby allowing a larger number of parallel accesses each clock cycle. Each of memory banks 212-1 through 212-N has an arbiter 214-1 through 214-N. Each arbiter 214 may include arbitration logic. Further, each arbiter 214 may include a crossbar.

The memory module 204 further includes DMA engine 216. In some examples, DMA engine 216 is capable of (i) receiving input data streams from the DPE interconnect 206 and writing the received data to memory banks 212, and (ii) reading data from memory banks 212 and sending the data out via the DPE interconnect 206, as described below. Through DMA engine 216, application data may be received from other sources (e.g., other subsystems or any DPE 114) within the SoC 100 and stored in the memory module 204. Through DMA engine 216, data may be read from the memory banks 212 of memory module 204 and sent to other destinations (e.g., other subsystems or any DPE 114). The memory module 204 may include configuration registers (CR) 218 that may be loaded with configuration data to control operation of the memory module 204. More specifically, the DMA engine 216 may be controlled by the configuration registers 218.

The DPE interconnect 206 in the DPE 114 facilitates communication with one or more other DPEs and/or with other subsystems of the SoC 100. The DPE interconnect 206 further enables communication of configuration and control data with the DPE 114. In some examples, the DPE interconnect 206 is implemented as an on-chip interconnect, such as an Advanced Microcontroller Bus Architecture (AMBA) eXtensible Interface (AXI) bus (e.g., or switch) and/or other interconnect circuitry.

The DPE interconnect 206 includes a stream network and a memory mapped network. The stream network is capable of exchanging data (e.g., application data) with other DPEs of DPE array 102 and/or other subsystems of the SoC 100. The memory mapped network is capable of exchanging data such as configuration and control data for the DPE(s).

The stream network of DPE interconnect 206 includes a stream switch 220 in each DPE 114, and stream switches 220 of DPEs are interconnected in forming the stream network. The stream switch 220 is used to communicate with other DPEs and/or the SoC interface block 116. For example, the stream switch 220 can communicate with a stream switch (SS) in a DPE 114 or tile 118 in the SoC interface block 116 in each cardinal direction—e.g., to the left, above, right, and below. The stream switch 220 is capable of allowing non-neighboring DPEs to communicate with the core 202 and/or the memory module 204 via the stream network. The stream switch 220 can communicate with the core 202 and the memory module 204. The core 202 can therefore communicate with other DPEs 114 via the stream switch 220. The stream switch 220 can also communicate with the DMA engine 216 of the memory module 204, which permits other DPEs 114 to communicate with the DMA engine 216. Cores of other DPEs may directly access the memory banks 212 of the memory module via the stream switch 220 (and stream network) and the DMA engine 216. The stream switch 220 may include configuration registers (CR) 222 to which configuration data may be written that can dictate which other DPEs and/or subsystems (e.g., the PL 106 and/or the PS 104) the DPE 114 can communicate with via the stream switch 220 and can dictate operation of the stream switch 220 (e.g., establishing circuit-switched point-to-point connections or packet-switched connections).

The memory mapped network of DPE interconnect 206 includes a memory mapped switch 224 in each DPE 114, and memory mapped switches 224 of DPEs are interconnected in forming the memory mapped network. The memory mapped switch 224 is used to exchange configuration and control data for the DPE 114. The memory mapped switch 224 is capable of receiving configuration data that is used to configure the DPE 114. The memory mapped switch 224 may receive configuration data from a memory mapped switch (MMS) of a DPE and/or a tile 118 located below DPE 114. The memory mapped switch 224 is capable of forwarding received configuration data to a memory mapped switch (MMS) of another DPE above DPE 114, to program memory 208 and/or configuration registers 210 within the core 202, to memory banks 212 and/or configuration registers 218 in the memory module 204, and/or to configuration registers 222 within the stream switch 220.

In some examples, the DPE array 102 is mapped to the address space of the PS 104. Accordingly, any configuration registers and/or memories within any DPE 114 may be accessed via the memory mapped network. For example, the program memory 208, the memory banks 212, and configuration registers 210, 218, 222 may be read and/or written via the memory mapped switch 224. Through the memory mapped network, subsystems of the SoC 100 are capable of reading an internal state of any configuration register 210, 218, 222, and are capable of writing configuration data to any configuration register 210, 218, 222. Through the memory mapped network, subsystems of the SoC 100 are capable of reading the program memory 208, and are capable of writing program instruction code to the program memory 208. Through the memory mapped network, subsystems of the SoC 100 are capable of reading data from and writing data to the memory bank 212 via the arbiters 214.

The memory module 204 is capable of communicating with a core (CORE) neighboring the memory module 204, and hence, is capable of operating as a shared memory that may be accessed by multiple DPEs. In the orientation of the example of FIG. 2, cores 202 of the illustrated DPE 114 and DPEs 114 above, to the right, and below the illustrated DPE 114 (e.g., cores that share a boundary with the memory module 204) can access the memory banks 212 through arbiters 214. Accordingly, in the example of FIG. 2, each core 202 or DPE 114 that has a shared boundary with the memory module 204 is capable of reading and writing to memory banks 212. If the orientation of the DPE 114 differs, orientations of cores that are capable of accessing the memory module 204 can differ.

The core 202 is capable of communicating with a memory module (MMOD) neighboring the core 202, and hence, is capable of accessing memory modules of other neighboring DPEs. In the orientation of the example of FIG. 2, the core 202 of the illustrated DPE 114 can access the memory modules of the illustrated DPE 114 and DPEs 114 above, to the left, and below the illustrated DPE 114 (e.g., memory modules that share a boundary with the core 202). Accordingly, in the example of FIG. 2, the core 202 is capable of reading and writing to any of the memory modules of DPEs that share a boundary with the core 202. The core 202 is capable of directing the read and/or write requests to the appropriate memory module based upon the addresses that are generated. If the orientation of the DPE 114 differs, orientations of memory modules that are capable of being accessed the core 202 can differ.

The core 202 may also include cascade interfaces, each of which is capable of providing direct communication with another core. The core 202 receives an input data stream (ICASS) directly from the core of the DPE to the left of the illustrated DPE 114. The received data stream may be provided to the data processing circuitry within core 202. The core 202 is capable of sending an output data stream (OCASS) directly to the core of the DPE to the right of the illustrated DPE 114. Each cascade interface may include a first-in-first-out (FIFO) interface for buffering. A cascade interface is capable of outputting to another core the contents of an accumulator register (AC) 226 in the core 202 and may do so each clock cycle. Accumulator register 226 may store data that is generated and/or being operated upon by data processing circuitry within core 202. The cascade interfaces may be programmed based upon configuration data loaded into the configuration registers 210 (e.g., activated or deactivated). In some other examples, the cascade interfaces are controlled by the core 202. For example, the core 202 may include program instruction code to read/write to the cascade interface(s).

Figure 3:
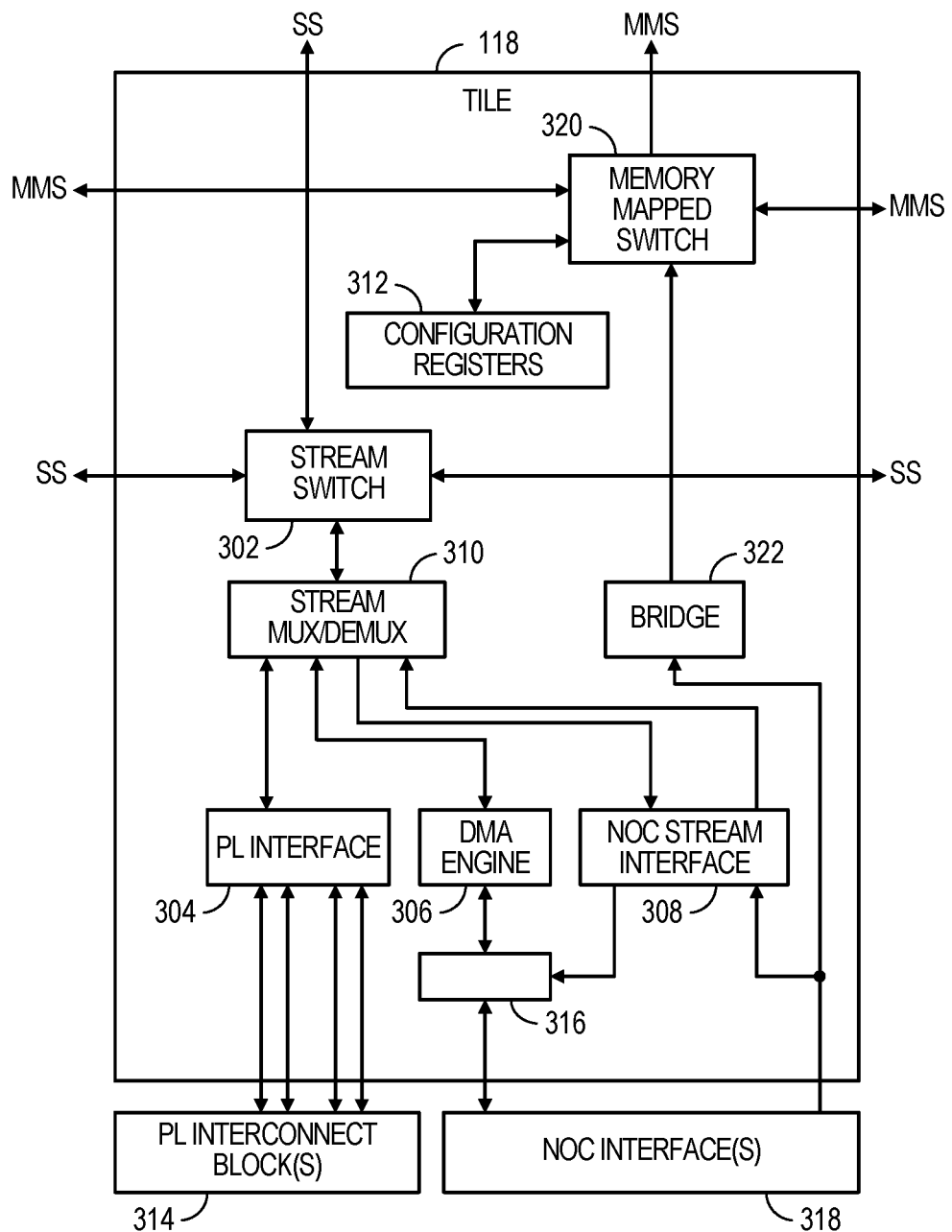
FIG. 3 depicts an architecture for a tile of a SoC interface block according to some examples.

FIG. 3 illustrates an example architecture for a tile 118 of the SoC interface block 116 according to some examples. In other implementations of a tile 118, a tile 118 may include additional or less circuitry and/or functionality. The tile 118 includes a stream switch 302. Stream switch 302 is connected horizontally to respective stream switches (SS) in neighboring tiles 118 and vertically to a stream switch (SS) in a neighboring DPE 114 to connect to and further form the stream network of the DPE array 102. Stream switches in neighboring tiles 118 are capable of exchanging data horizontally. The stream switch 302 is capable of communicating with the DPE 114 immediately above the tile 118. The stream switch 302 is also connected to and may communicate with a PL interface 304, a DMA engine 306, and/or to a NoC stream interface 308 via a stream multiplexer/demultiplexer ("stream mux/demux") 310.

The stream switch 302 is configurable by configuration data loaded into configuration registers 312. The stream switch 302, for example, may be configured to support packet-switched and/or circuit-switched operation based upon the configuration data. Further, the configuration data defines the particular DPE and/or DPEs within DPE array 102 to which stream switch 302 communicates.

The stream multiplexer/demultiplexer 310 is capable of directing data received from the PL interface 304, DMA engine 306, and/or NoC stream interface 308 to the stream switch 302. Similarly, the stream multiplexer/demultiplexer 310 is capable of directing data received from the stream switch 302 to the PL interface 304, DMA engine 306, and/or to NoC stream interface 308. The stream multiplexer/demultiplexer 310 may be programmed by configuration data stored in the configuration registers 312 to route selected data to the PL interface 304, to the DMA engine 306 where such data is sent over the programmable network 128 of the NoC 112 as memory mapped transactions, and/or to the NoC stream interface 308 where the data is sent over the programmable network 128 of the NoC 112 as a data stream.

The PL interface 304 couples to the PL 106 of the SoC 100 and provides an interface thereto. The PL interface 304 couples directly to one or more programmable interconnect elements and/or boundary logic interfaces (BLIs), generically, one or more PL interconnect blocks 314, in the PL 106. In some examples, the PL interface 304 is further coupled to other types of circuit blocks and/or subsystems to be capable of transferring data between tile 118 and such other subsystems and/or blocks.

The DMA engine 306 is capable of operating to direct data into the programmable network 128 of the NoC 112 through a selector block 316 and on to an NMU and/or NSU, generically, a NoC interface(s) 318. The DMA engine 306 is capable of receiving data from DPEs (via the stream network) and providing such data to the programmable network 128 of the NoC 112 as memory mapped transactions.

In some examples, the DMA engine 306 is capable of accessing an external memory. For example, DMA engine 306 is capable of receiving data streams from DPEs and sending the data stream to external memory through the programmable network 128 of the NoC 112 to a memory controller located within the SoC 100. The memory controller then directs the data received as data streams to the external memory (e.g., initiates reads and/or writes of the external memory as requested by DMA engine 306). Similarly, DMA engine 306 is capable of receiving data from external memory where the data may be distributed to other tile(s) 118 of SoC interface block 116 and/or up into target DPEs 114.

The NoC stream interface 308 is capable of receiving data from the programmable network 128 of the NoC 112 via the NoC interface(s) 318 and forwarding the data to the stream multiplexer/demultiplexer 310. The NoC stream interface 308 is further capable of receiving data from stream multiplexer/demultiplexer 310 and forwarding the data to NoC interface 318 through the selector block 316. The selector block 316 is configurable to pass data from the DMA engine 306 or from NoC stream interface 308 on to NoC interface(s) 318.

The tile 118 includes a memory mapped switch 320. The memory mapped switch 320 connects vertically to the memory mapped switch (MMS) of the DPE immediately above, which permits, for example, the memory mapped switch 320 to be capable of communicating with the column of DPEs above the tile 118 and to further form the memory mapped network of the DPE array 102. The memory mapped switch 320 connects horizontally to memory mapped switches (MMS) in neighboring tiles 118, which permits, for example, the memory mapped switch 320 to be capable of moving data (e.g., configuration and control data) from one tile to another to reach a correct column of DPEs and direct the data to the target DPE within the column. The memory mapped switch 320 may also connect to configuration registers 312 within tile 118. Through memory mapped switch 320, configuration data may be loaded into configuration registers 312 to control various functions and operations performed by components within tile 118. The memory mapped switch 320 is coupled to NoC interface(s) 318 via bridge 322. The bridge 322 is capable of converting memory mapped data transfers from the programmable network 128 of the NoC 112 (e.g., configuration and control data) into memory mapped data that may be received by memory mapped switch 320. Accordingly, the PS 104 or any other subsystem or circuit block can communicate with, e.g., a core 202 or memory module 204 of any DPE 114 via the memory mapped network of the DPE array 102.

Applications (e.g., a user design) can be designed, compiled, and loaded on the SoC 100 based on the architecture described above or on other programmable ICs based on other architectures. The applications can be compiled according to some examples. Compiling an application generates a boot image file that includes executable code that can be loaded onto the SoC and executed.

Figure 4:
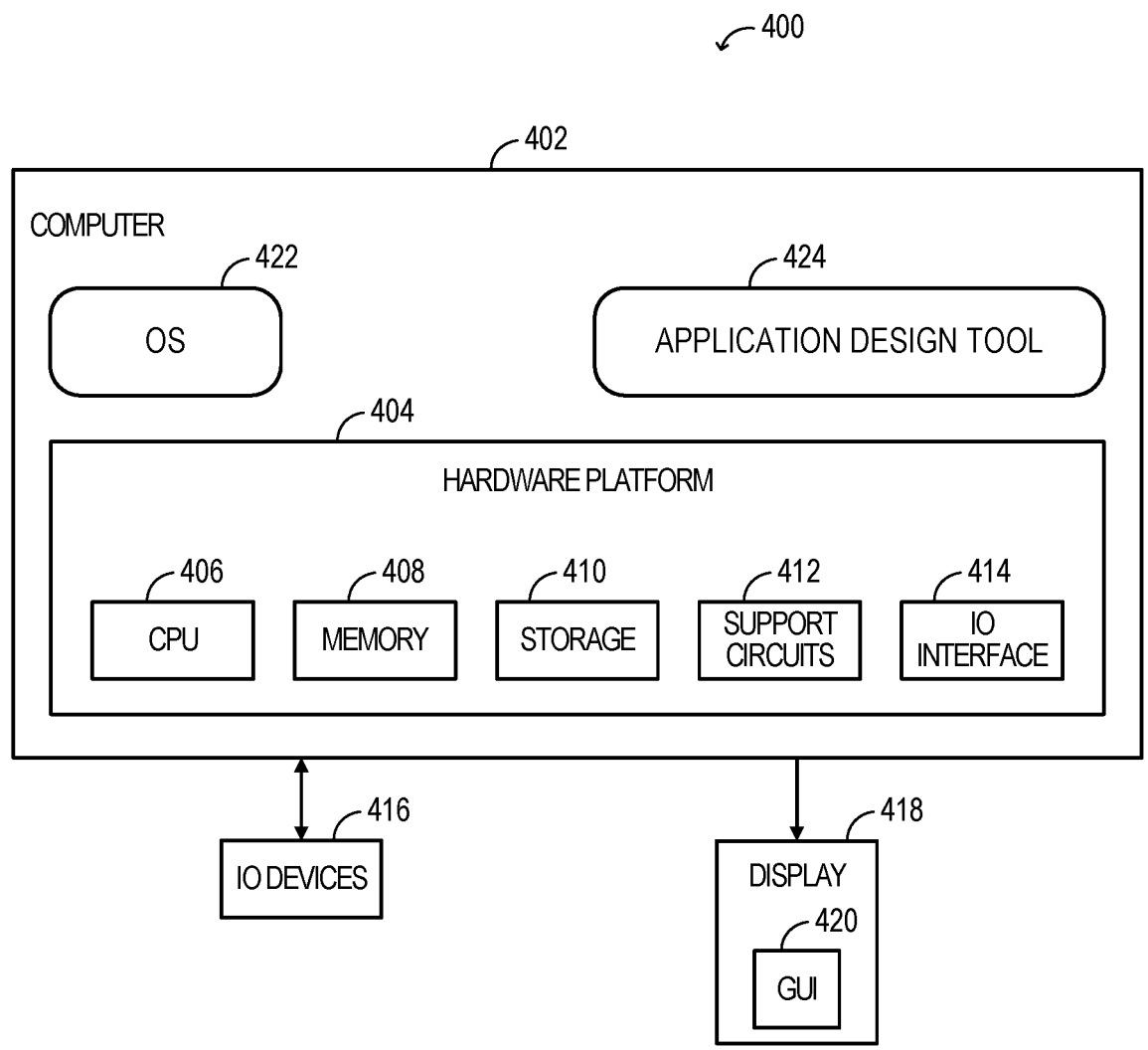
FIG. 4 is a block diagram depicting an example of an application design system in accordance with some examples.

FIG. 4 is a block diagram depicting an example of an application design system 400, in accordance with some examples. The application design system 400 (e.g., a processor-based system) can be used by a user to create an application that can be compiled to generate a boot image file that can be loaded on the SoC 100 of FIG. 1, for example. The application design system 400 includes a computer 402 coupled to input/output (IO) devices 416 and a display 418. The computer 402 includes a hardware platform 404 that can include components of a computing device, such as a central processing unit (CPU) 406, system memory 408, storage 410, various support circuits 412, and an IO interface 414. The CPU 406 can include one or more microprocessors. The CPU 406 is configured to execute program instruction code that performs one or more operations described herein. The program instruction code can be stored in system memory 408, storage 410, or any other memory in the hardware platform 404 (e.g., cache memory). The system memory 408 includes one or more non-transitory storage mediums that store information and can include, for example, RAM, ROM, or a combination thereof. The storage 410 includes one or more local non-transitory storage mediums, such as hard disks, flash memory modules, solid state disks, optical disks, and the like. The storage 410 can also include interface(s) configured for communication with one or more network data storage systems. The support circuits 412 can include cache, power supplies, clock circuits, data registers, IO interfaces, and the like. The IO interface 414 includes interfaces to/from the computer 402. The IO interface 414 can be coupled to the IO devices 416, which can include a keyboard, mouse, and the like. The IO interface 414 can also be coupled to the display 418, which can present a graphical user interface (GUI) 420 to a user.

The computer 402 further includes a software platform comprising an operating system (OS) 422 and an application design tool 424. The OS 422 and the application design tool 424 include program instruction code that is executed by the CPU 406, which program instruction code can be stored in system memory 408, storage 410, or any other memory. The OS 422 can include any known operating system, such as Linux®, Microsoft Windows®, Mac OS®, and the like. The application design tool 424 is an application that executes within the OS 422, which provides an interface to the hardware platform 404. Some operation of the application design tool 424 is described below.

Figure 5:
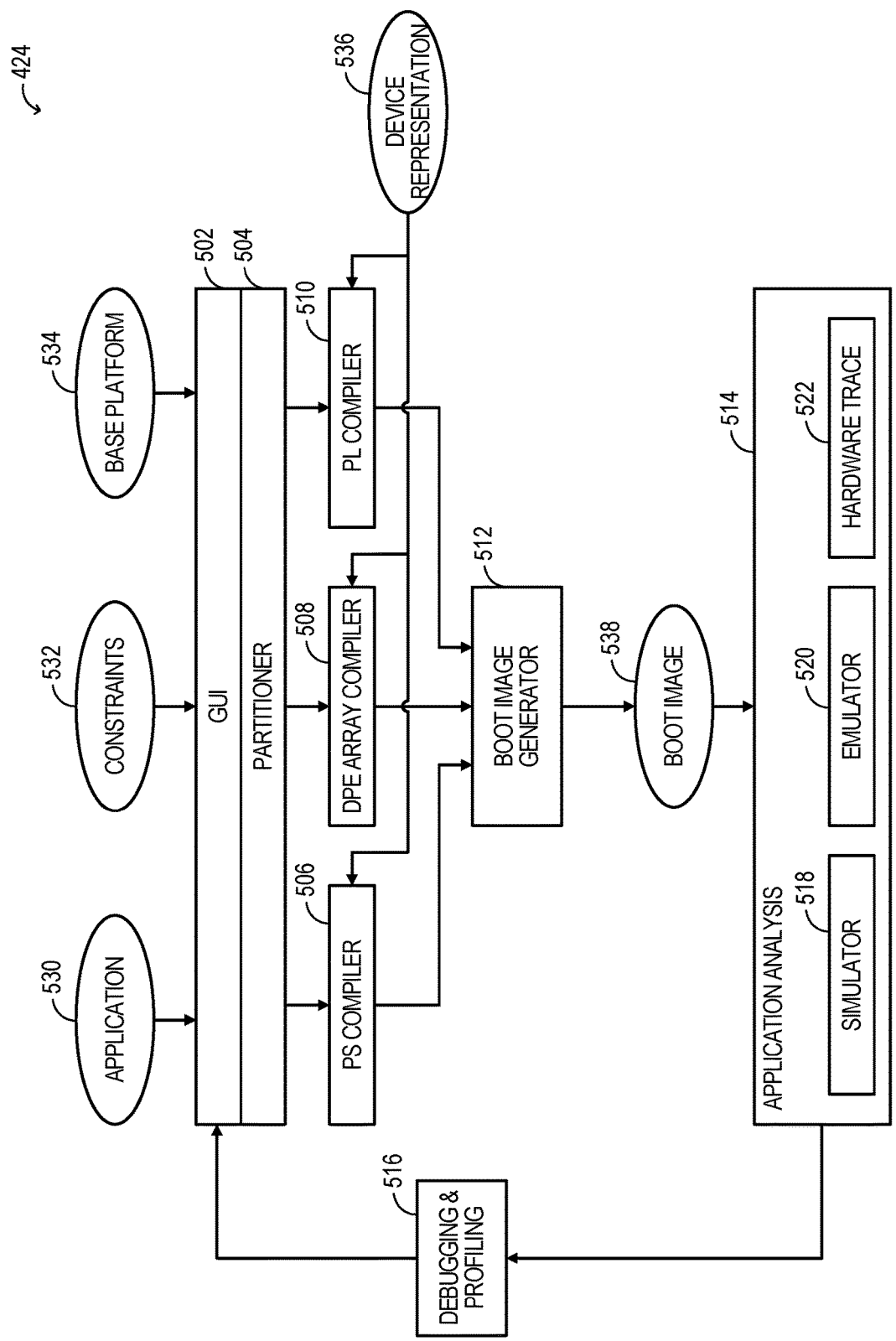
FIG. 5 is a block diagram depicting an application design tool capable of being implemented on the application design system of FIG. 4 according to some examples.

FIG. 5 is a block diagram depicting an application design tool 424 capable of being implemented on the application design system 400 of FIG. 4 according to some examples. The application design tool 424 includes a GUI module 502, a partitioner module 504, a PS compiler module 506, a DPE array compiler module 508, a PL compiler module 510, a boot image generator module 512, an application analysis module 514, and a debugging and profiling module 516. The application analysis module 514 includes a simulator module 518, an emulator module 520, and a hardware trace module 522. The modules 502-522 are just an example implementation of the application design tool 424. The functions performed by the modules 502-522 described herein can be performed by a different configuration of one or more modules in the application design tool 424. The modules 502-522 in the application design tool 424 can be implemented by circuitry that is part of the application design system 400, by firmware and/or software in the application design system 400, or by a combination thereof.

The GUI module 502 provides an interface, via the GUI 420 and IO devices 416, for example, for a user to create an application 530 (e.g., a user design). The application 530 can be a file including source code that defines the functionality of the application 530. The application 530 can be implemented according to a graph programming model. The application 530 can include kernel source code that defines kernels, and can define communication links (e.g., data flows) that link the kernels. The application 530 can be written in various types of object orientated programming languages (e.g., C++ or another language). An advantage of implementing a graph programming model for the application 530 is that a graph can have a highly parallelized architecture. In some examples, the semantics of the graph established by the application 530 is based upon the general theory of Kahn Process Networks which provides a computation model for deterministic parallel computation that is applied to the heterogeneous architecture in the SoC 100 (which includes different programmable architectures, e.g., the DPE array 102, the PS 104, and/or the PL 106).

Some constraints of the constraints file 532 can also be defined via the GUI module 502. The constraints can be user-defined, such as performance constraints and placement constraints, or pre-defined system constraints, such as constraints of the architecture like permissible number of data flows through a port of stream switch based on a mode, etc. User-defined constraints can be defined via the GUI module 502, for example. The constraints of the constraints file 532 can restrict some functionality to be performed within a defined latency, can restrict where various kernels can be placed in relation to another kernel, can restrict in which subsystem (e.g., the DPE array 102, the PS 104, or the PL 106) functionality can be mapped, etc., for example.

A base platform 534 can be a pre-defined class library that defines various functions, application programming interfaces (APIs), etc. that can be used by the application 530 via the GUI module 502. The application 530 (e.g., graph) can use various objects defined in the class library to call functionality in the application 530.

After creating the application 530, the application 530, constraints file 532, and base platform 534 are passed to the partitioner module 504. The partitioner module 504 partitions functionality of the application 530 to the different subsystems (e.g., the DPE array 102, the PS 104, or the PL 106). The partitioner module 504 can parse the application, e.g., based on the objects that are used to define different functions of the application 530 to partition the application 530 to the different subsystems.

The partitioned functionality is passed to the PS compiler module 506, the DPE array compiler module 508, and the PL compiler module 510. In some examples, a compiler module may not be passed partitioned functionality if the application 530 does not include functionality to be mapped to the corresponding subsystem. The PS compiler module 506 compiles the functionality partitioned to the PS 104 and generates binaries from the compiling. The DPE array compiler module 508 compiles the functionality partitioned to the DPE array 102 (e.g., including mapping and routing) and generates binaries from the compiling. The PL compiler module 510 compiles the functionality partitioned to the PL 106 (e.g., including placing and routing) and generates a bitstream from the compiling. The compiling by any of the PS compiler module 506, the DPE array compiler module 508, and the PL compiler module 510 can be based on a device representation file 536 that is a logical representation of the architecture of the SoC 100, e.g., such that various functionality can be mapped or placed on elements of a given subsystem. The compiling by any of the PS compiler module 506, the DPE array compiler module 508, and the PL compiler module 510 can be iteratively performed based on the compiling of any other of the PS compiler module 506, the DPE array compiler module 508, and the PL compiler module 510. For example, to meet some constraints, mapped functionality within the DPE array 102 may be re-mapped based on the placement of logic within the PL 106 to meet timing constraints between the DPE array 102 and the PL 106.

The boot image generator module 512 assembles the binaries and bitstream from the compiler modules 506-510 in a boot image file 538. The boot image file 538 is assembled in a format that is capable of being read, loaded, and executed on the SoC 100. An example format of a boot image file is described in more detail below. The boot image file 538 is capable of being read, loaded, and executed on, e.g., the SoC 100 to implement the application 530 on the SoC 100. As described in more detail below, the boot image file 538 may include a number of partitions. Each partition may have an associated authentication certificate and may be encrypted. The boot image generator module 512 can prepend an authentication certificate to and can encrypt any partition. The boot image file 538 can be stored in any of the system memory 408 and the storage 410 of the application design system 400 after being assembled, for example. Subsequently, the boot image file 538 can be loaded into another non-transitory storage medium, such as the flash memory 132 of FIG. 1.

The application analysis module 514 is then capable of determining performance indicators of the boot image file 538 operating on the SoC 100. The simulator module 518 simulates the operation of the boot image file 538 on the SoC 100, and the emulator module 520 emulates the operation of the boot image file 538 on the SoC 100. The simulator module 518 can be a SystemC simulator, for example. The hardware trace module 522 is capable of, when communicatively coupled to the SoC 100, receiving trace information from the SoC 100 after the boot image file 538 has been loaded on the SoC 100 and the SoC 100 has performed operations according to the boot image file 538.

Results of the application analysis module 514 are passed to the debugging and profiling module 516. The debugging and profiling module 516 can parse the results from the application analysis module 514 and display, via the GUI module 502, various events and performance metrics indicated by the results. The user can view the events and performance metrics via the GUI module 502 and GUI 420 on the display 418, for example, and can responsively and iteratively modify the application 530.

Figure 6:
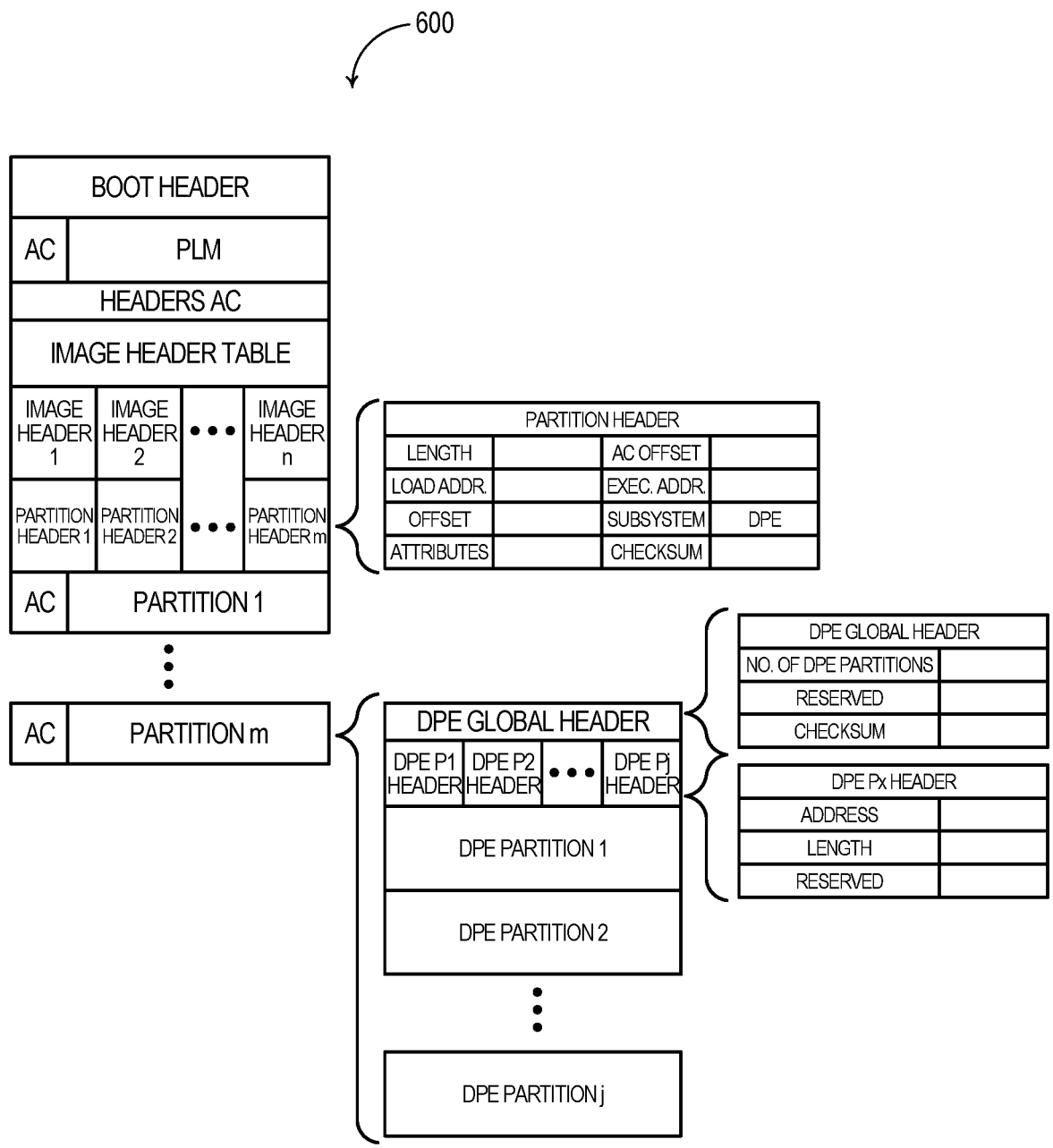
FIG. 6 depicts a format of a boot image file according to some examples.

FIG. 6 depicts a format 600 of a boot image file that may be generated by the application design tool 424 of FIG. 5 according to some examples. The format 600 permits multiple Executable and Linkable Format (ELF) files to be included in a boot image file, where the ELF files are used to configure the different programmable subsystems of the SoC 100. A boot image file can have one or more ELF files for each subsystem of the SoC 100. The different subsystems can have different ELF files. Each ELF file can be in one or multiple partitions. For example, when the application 530 is compiled and compiling results in executable code, configuration data, and/or application data being writable to non-contiguous address ranges of memory, the executable code, configuration data, and/or application data may be partitioned, where each partition is a contiguous address range of memory. The address range of a partition is not contiguous with an address range of memory of another partition.

The format 600 includes a boot header, a platform loader and manager (PLM), and an authentication certificate (AC) of the PLM prepended to the PLM. The boot header can include various parameters, each of which is capable of being pointed to by an address offset defined by the format 600. The boot header can include a header signature, a key source, a PLM source offset, a PLM image length, a PLM load address, a PLM execution address, a total PLM length, a boot header checksum, and an image header table offset. The key source can indicate whether the PLM is encrypted and, if so, the source of the encryption key on the SoC 100. The PLM source offset indicates the location of the PLM in the boot image file. The PLM image length is the length of the PLM after any decryption. The PLM load address is the destination address to which the PLM is copied. As described subsequently, the destination address to which the PLM is copied is in the local RAM 124 in the PS 104. The PLM execution address is an entry vector for execution of the PLM. The total PLM length is the total size of the PLM after encryption and including any authentication certificate and/or padding. The boot header checksum is a sum of the various parameters in the boot header as a verification of the parameters. The image header table offset is a pointer to an image header table (as described below). The PLM is executable code for loading the remaining boot image file and programming the SoC 100 according to the partitions of the boot image file.

The format 600 includes a headers authentication certificate (AC) prepended to an image header table. The image header table (pointed to by the image header table offset) can include various parameters, each of which is capable of being pointed to by an address offset defined by the format 600. The image header table can include a number of image headers, and a first image header offset. The number of image headers indicates a total number of images in the boot image file. The first image header offset is a pointer to the first image header in the boot image file.

The format 600 includes image headers 1 through n, where the first image header 1 is pointed to by the first image header offset of the image header table. Each image header includes various parameters, each of which is capable of being pointed to by an address offset defined by the format 600. Each image header can include a next image header link, a corresponding partition header pointer, a partition count length, and an image name. The next image header link is a link to the next image header or is null ("0") if that image header (containing the next image header link) is the last image header. The corresponding partition header is a link to the first partition header associated with the respective image header. The partition count length is the number of partitions associated with the respective image header. The image name is a text string of the name of the image corresponding to the respective image header and ends in a string terminator.

The format 600 includes partition headers 1 through m, where each partition header is pointed to by a corresponding partition header pointer of an image header. Each partition header includes various parameters, each of which is capable of being pointed to by an address offset defined by the format 600. Each partition header, as illustrated, includes a length, an authentication certificate (AC) offset, a load address, an execution address, an offset, a subsystem, attributes, and a partition header checksum. The length can be the encrypted or unencrypted data length of the corresponding partition, which may also include a length of any authentication certificate. The authentication certificate (AC) offset indicates the location of the authentication certificate of the corresponding partition. The load address indicates the destination address into which the corresponding partition is to be loaded. The execution address indicates the entry point of the corresponding partition when executed. The offset indicates the position of the corresponding partition relative to the beginning of the boot image file. The subsystem indicates to which subsystem the corresponding partition is directed and permits the PLM to responsively process the corresponding partition accordingly. The attributes can include an indication whether an authentication certificate has been included for the corresponding partition and a partition checksum indication. If a partition checksum is implemented, the partition checksum indication provides an offset of the checksum section of the respective partition from the beginning of the boot image file. The partition header checksum of the partition header is a sum of the fields within the respective partition header.

The format 600 includes partitions 1 through m (e.g., first-level partitions as previously described) and corresponding authentication certificates prepended to the respective partition. Each partition can include, e.g., executable code, a bitstream, configuration data, application data, etc., that is to be loaded for a subsystem. For example, one or more partitions can include bitstreams to be loaded into the PL 106; one or more partitions can include executable code and/or application data that form an ELF file to be executed by the PS 104; and one or more partitions can include configuration data of the programmable network 128 of the NoC 112 and programmable boundary elements (e.g., programmable ones of the HB 108 and/or I/O 110). A single global DPE partition is implemented for ELF files of the DPE array 102. The single global DPE partition for the DPE array is illustrated as the last partition (Partition m), but may be at any position in a boot image file.

The global DPE partition includes a DPE global header, DPE partition headers 1 through j (DPE P1 header through DPE Pj header), and DPE partitions 1 through j (e.g., embedded partitions as previously described). The DPE global header can include various parameters, each of which is capable of being pointed to by an address offset defined by the format 600. The DPE global header includes, as illustrated, the number of DPE partitions included in the global DPE partition and a checksum. Each DPE partition header can include various parameters, each of which is capable of being pointed to by an address offset defined by the format 600. Each DPE partition header includes, as illustrated an address and a length. The address indicates a pointer to the corresponding DPE partition, and the length is the length of the corresponding DPE partition.

Figure 7:
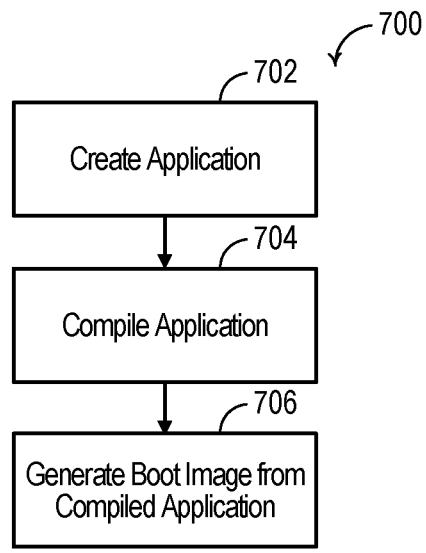
FIG. 7 is a flowchart of a method for generating a boot image file according to some examples.

FIG. 7 is a flowchart of a method 700 for generating a boot image file according to some examples. The method 700 may be implemented by the application design tool 424 of the application design system 400. In block 702, an application is created. A user can create an application 530 using the GUI module 502 as described previously. In block 704, the application is compiled. As described previously, the application 530 can be partitioned based on the functionality in the application 530 to corresponding subsystems of the SoC 100. The partitions can be passed to PS compiler module 506, DPE array compiler module 508, and PL compiler module 510. The compiler modules 506-510 compile the respective partitions of the application 530 based on constraints in a constraints file 532 and a logical representation of the SoC 100 in a device representation file 536. The compiler modules 506-510 generate binaries and bitstreams based on the corresponding subsystem. In block 706, the boot image file is generated from the compiled application. The boot image generator module 512 assembles the bitstreams and binaries generated by the compiler modules 506-510 into a boot image file 538 in a format that is capable of being read, loaded, and executed by the SoC 100. The boot image file 538 can then be stored in a non-transitory storage medium, such as the system memory 408 or storage 410, and can subsequently loaded in a non-transitory storage medium communicatively coupled to the SoC 100, such as the flash memory 132.

Figure 8:
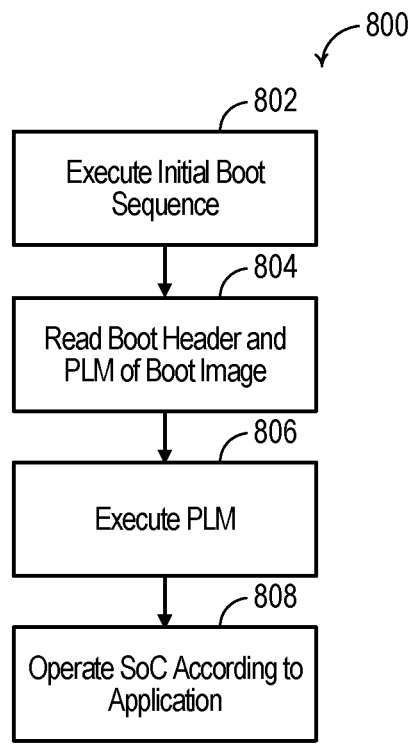
FIG. 8 is a flowchart of a method for operating an SoC according to some examples.

FIG. 8 is a flowchart of a method 800 for operating an SoC according to some examples. The SoC in this example is the SoC 100 described herein, although other SoCs with other architectures may be used. At block 802, an initial boot sequence is executed. For example, executable code is stored in the local ROM 122 of the PS 104. The PMC 120 may execute the code, e.g., upon the SoC 100 being powered up. The local ROM 122 may also include some minimal configuration data of the SoC 100. For example, various subsystems may be configured to permit communications before a boot image file can be accessed. As an example, a memory controller of the HB 108 and an I/O circuit of the I/O 110 may be configured (e.g., by configuration data stored in the local ROM 122) and brought to a stable state before the boot image file can be accessed.

At block 804, a boot header and a PLM of a boot image file are read. The boot image file is initially stored on the flash memory 132 exterior to the SoC 100. The PMC 120 executing code stored in the local ROM 122 accesses the boot image file via a memory controller in the HB 108 and an I/O 110. The PMC 120 reads the boot header to obtain the parameters in the boot header. The PMC 120 can read the header signature to authenticate the PLM (e.g., using the authentication engine) and can read the key source to determine whether the PLM is encrypted. Using other attributes, the PLM is read by the PMC 120, and the PMC 120 writes the PLM, after decrypting (e.g., using the encryption/decryption engine) the PLM if encrypted, to the local RAM 124 in the PS 104. The PMC 120 also writes the image header table offset to the RAM 124 as data that the PMC 120 will access subsequently when executing the PLM.

At block 806, the PLM is executed. Control is handed over to the PLM by the PMC 120 executing the executable code of the PLM that is stored in the RAM 124. For convenience, when the PLM is referred to as performing some action, this is shorthand for the PMC 120 executing the executable code of the PLM to perform that action. Execution of the PLM is detailed in the example of FIG. 9. Execution of the PLM results in the partitions of the boot image file being loaded on the various subsystems of the SoC 100.

At block 808, the SoC is operated according to the application. The partitions of the boot image file, which were compiled and assembled from the application 530, are executed by the subsystems of the SoC 100 according to the boot image file. Hence, the SoC 100 operates according to the application 530.

Figure 9:
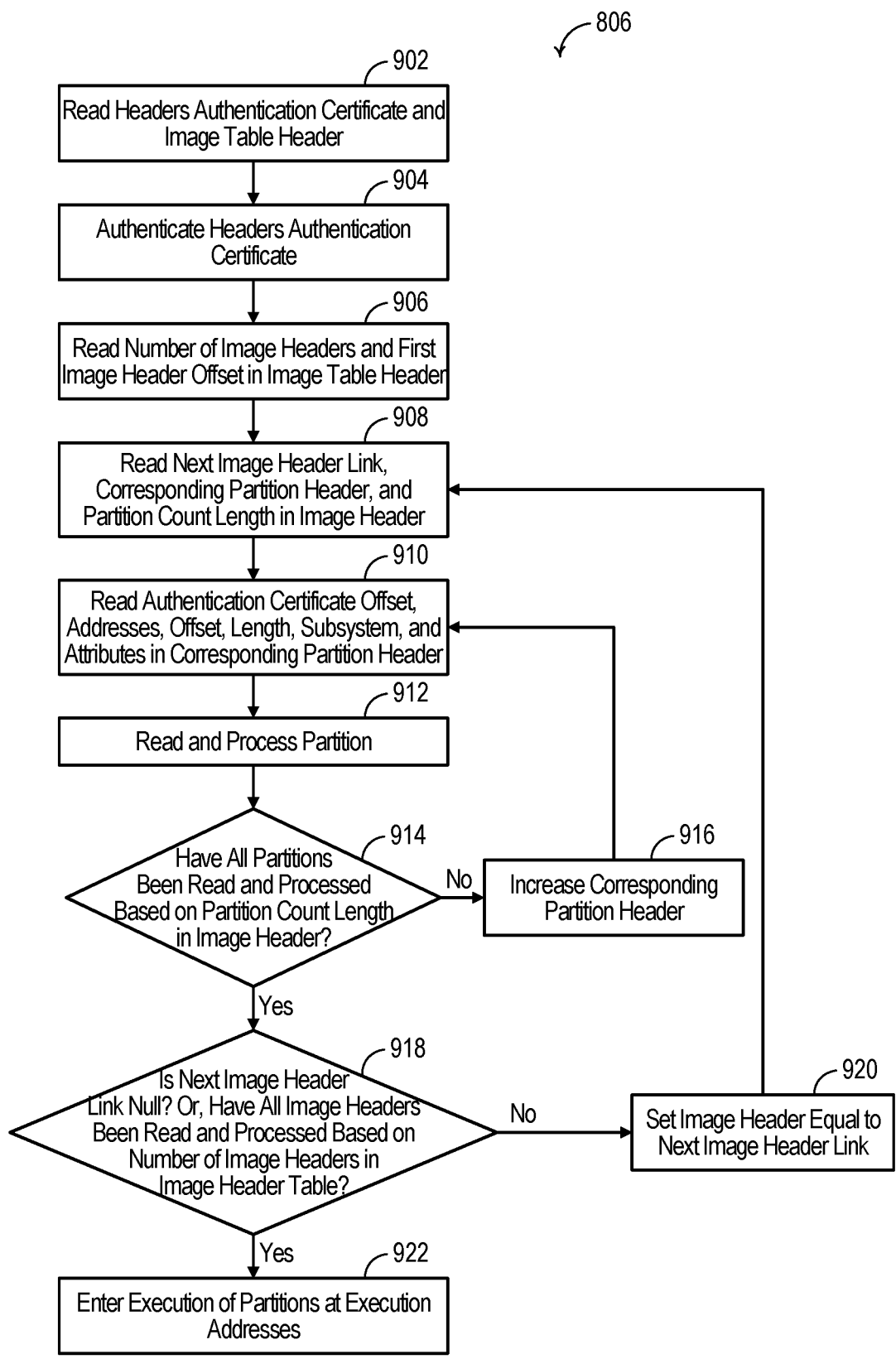
FIG. 9 is a flowchart of executing a platform loader and manager (PLM) according to some examples.

FIG. 9 is a flowchart of executing the PLM according to block 806 according to some examples. In block 902, the PLM reads the headers authentication certificate and image table header of the boot image file. The PLM uses the image header table offset stored in the RAM 124 to access the headers authentication certificate and the image table header. In block 904, the PLM authenticates the headers authentication certificate. In block 906, the PLM reads number of image headers and first image header offset in the image table header. In block 908, the PLM reads the next image header link, corresponding partition header, and partition count length in the image header. In a first iteration of block 908, the image header is indicated by the first image header offset read in block 906. In subsequent iterations, the image header can be different as described below.

In block 910, the PLM reads the authentication certificate offset, load and execution addresses, offset, length, subsystem, and attributes in the corresponding partition header. In a first iteration of block 910 within the nested loop, the corresponding partition header is the corresponding partition header read in block 908. In subsequent iterations of the nested loop, the corresponding partition header can be different as described below. In block 912, the PLM reads and processes the partition, such as described below with respect to FIG. 10. At block 914, the PLM determines whether all partitions corresponding to the image header have been read and processed based on the partition count length in the image header read in block 908. If not, in block 916, the PLM increases the corresponding partition header to the next subsequent partition header, and execution loops back to block 910 for the nested loop.

If all partitions have been read and processed as determined in block 914, the PLM determines in block 918 whether the next image header link is null. Alternatively or additionally, the PLM determines whether all image headers have been read and processed based on the number of image headers in the image header table read in block 906. If not, in block 920, the PLM sets the image header to be equal to the next image header link, and execution loops back to block 908.

If the next image header link is null (and/or all image headers have been read and processed) as determined in block 918, all partitions have been read and processed, and have been loaded to respective load addresses in the SoC 100. The PLM can hand over control to the SoC 100 to operate according to the partitions by entering execution at the execution addresses in block 922. Accordingly, with the partitions of the boot image file being processed and loaded to the respective load addresses in the SoC 100 and execution being entered at the respective execution addresses, the SoC 100 may operate according to the application 530.

Figure 10:
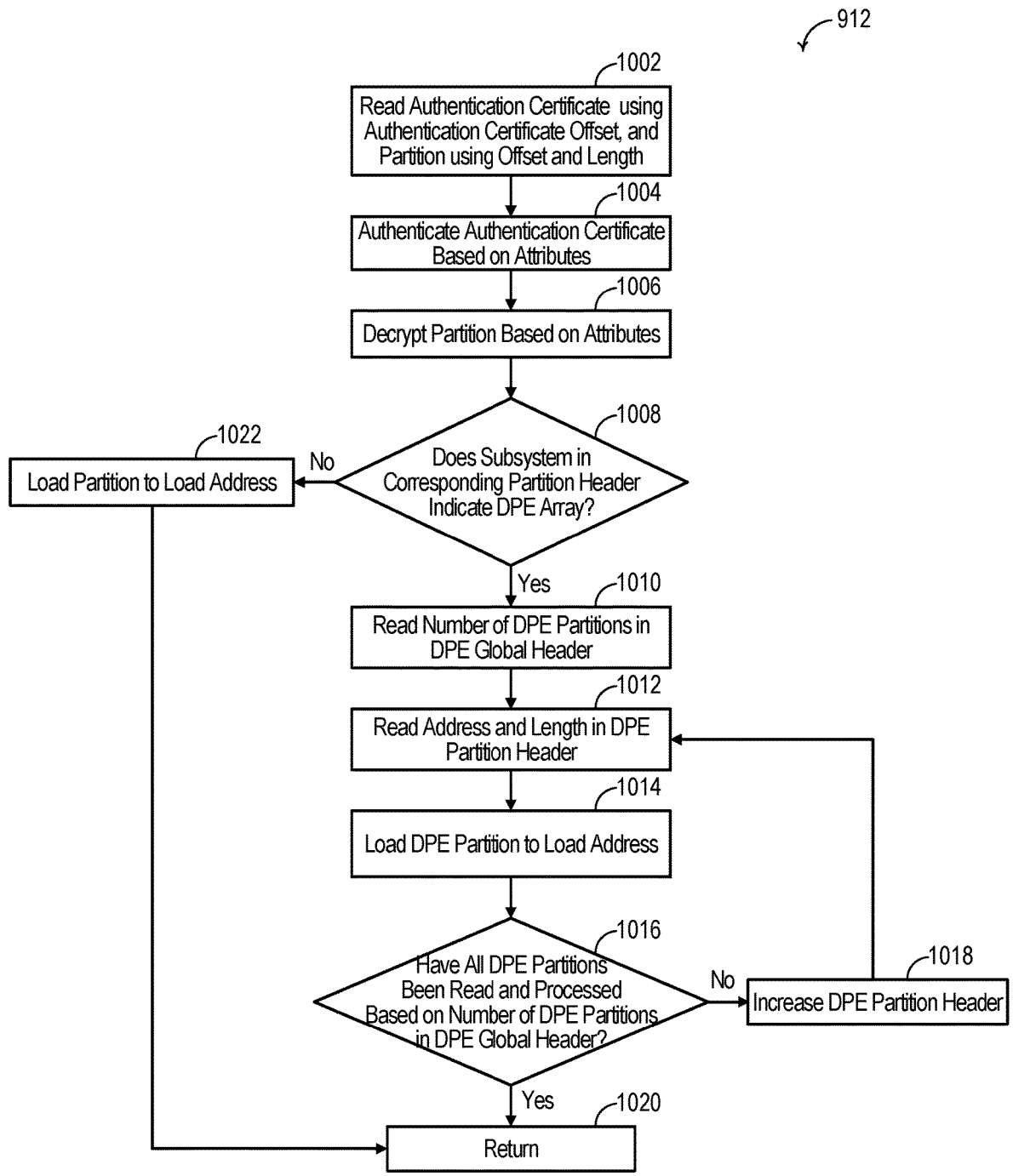
FIG. 10 is a flowchart of reading and processing a partition by the PLM according to some examples.

FIG. 10 is a flowchart of reading and processing a partition by the PLM according to block 912 according to some examples. Preceding entering the reading and processing at block 912, the PLM read the authentication certificate offset, load and execution addresses, offset, length, subsystem, and attributes in the corresponding partition header. At block 1002, the PLM reads the authentication certificate using the authentication certificate offset, and reads the partition using the offset and length. At block 1004, the PLM authenticates (e.g., using the authentication engine) the authentication certificate, if implemented. At block 1006, the PLM decrypts (e.g., using the encryption/decryption engine) the partition based on the attributes, which indicate if the partition is encrypted and, if so, the source of the encryption key.

At block 1008, the PLM determines whether the subsystem in the corresponding partition header indicates that the partition is for a DPE array. If so, the partition is a global DPE partition, and in block 1010, the PLM reads the number of DPE partitions in the DPE global header. In block 1012, the PLM reads the address and length in the DPE partition header. In block 1014, the PLM loads the DPE partition to an address indicated by the load address. The load address determines to which DPE 114, and more particularly, which program memory or memory bank of a DPE 114, the DPE partition is loaded. Loading the DPE partition can include transmitting the DPE partition via the programmable network 128 of the NoC 112, a NoC interface 318 at a tile 118, the bridge 322 and memory mapped switch 320 of the tile 118, and the memory mapped network of the DPE array 102 to the target DPE and memory. In block 1016, the PLM determines whether all DPE partitions have been read and processed based on the number of DPE partitions in the DPE global header. If not, in block 1018, the PLM increases the DPE partition header to the next DPE partition header, and the method loops back to block 1012. If the PLM determines that all DPE partitions have been read and processed in block 1016, the method returns in block 1020, such as to block 914 in FIG. 9.

If the PLM determines that the subsystem in the corresponding partition header indicates that the partition is not for a DPE array in block 1008, in block 1022, the PLM loads the partition to the load address. Loading a partition to other subsystems can include: writing a partition to local RAM 124 for the PS 104; writing a bitstream of a partition to programmable elements of the PL 106 via the CF 126; and writing configuration data of a partition to register blocks via the NPI 130 to configure the programmable network 128 of the NoC 112 and any programmable boundary elements. In block 1020, the method returns, such as to block 914 in FIG. 9.

During the execution of the methods of FIGS. 8 through 10, any parameter or partition can be loaded into any memory that the PMC 120 may access, e.g., local memory, cache, and/or RAM 134. For example, the PMC 120 may load partitions and/or any parameters in RAM 134, e.g., after any authenticating and/or decrypting and before loading the partitions onto the subsystems of the SoC 100.

As indicated by FIG. 6, the format 600 of a boot image file can permit reduced overhead, and as indicated by FIGS. 9 and 10, processing can be reduced by implementing a boot image file of the format 600. In the format 600, each first-level partition (including the single global partition) can have an associated authentication certificate and attributes for encryption, and the embedded DPE partitions do not have separate authentication certificates and attributes for encryption. Rather, the embedded DPE partitions have the same authentication certificate and attributes for encryption as the single global partition. Hence, overhead of the boot image file can be reduced by not having separate authentication certificates and attributes for encryption for the DPE partitions. Further, a single authentication certificate can be authenticated for the DPE partitions, instead of a separate authentication certificate for each DPE partition. Also, one decryption key and one decryption process can be implemented for the DPE partitions instead of separate keys and processes. Processing one authentication certificate and performing one decryption for the DPE partitions can reduce boot time of the SoC 100. For example, fewer transactions are used to read and process the authentication certificate and attributes for encryption.

As a simple example, assume that the SoC 100 includes 400 DPEs 114 that will have an ELF file when loaded, and each ELF file has five DPE partitions (e.g., one for the program memory of the core and one for each memory bank that may be shared by the core). Also, assume that an image header is 64 bytes, a partition header is 64 bytes, attributes relating to encryption ("encryption overhead") is 128 bytes, and an authentication certificate and other attributes relating to authentication ("authentication overhead") is 3,680 bytes. In this example if the DPE partitions are first-level partitions in a boot image file, there would be 400 image headers (e.g., one for each ELF file) and 2,000 (five times 400) partition headers, encryption overhead, and authentication overhead. This would result in $(64*400)+((64+128+3,680)*5*400)=7,769,600$ bytes of overhead for partitions for DPEs in the boot image file. However, in this example if the DPE partitions are embedded partitions in a single global partition in a boot image file, there would be one image header, partition header, encryption overhead, authentication overhead, and DPE global header, and 2,000 (five times 400) DPE partition headers. Assume that the DPE global header is twelve bytes (e.g., which can include reserved bits and/or a checksum), and a DPE partition header is sixteen bytes. This would result in $64+64+128+3,680+12+(16*5*400)=35,948$ bytes of overhead for partitions for DPEs in the boot image file. This represents a reduction of overhead of 7,733,652 bytes.

In furtherance of this example, authenticating a partition by, e.g., an RSA engine can take around 600 to 700 microseconds. When the DPE partitions are first-level partitions in a boot image file, there would be 2,000 partitions to authenticate, which would take around 1.2 to 1.4 seconds. When the DPE partitions are embedded partitions in a single global partition in a boot image file, there is a single global partition to authenticate, which would take around 600 to 700 microseconds.

In some examples, advanced encryption, such as key rolling, can be implemented. In key rolling, a partition can be divided into multiple chunks, and each chunk can be encrypted using a key embedded in the previous chunk. Accordingly, overhead can be increased based on the number of chunks implemented.

Implementing embedded DPE partitions in a single global first-level partition permits larger chunks and/or fewer breaks in chunks based on size of first-level partitions, which can reduce overhead.

In some examples, the format of the boot image file accommodates a single global first-level partition that includes all DPE partitions as embedded partitions. In other examples, multiple global first-level partition may be implemented in the format of a boot file where each global first-level partition includes multiple DPE partitions as embedded partitions. A size of the boot image file may be reduced and boot time may be reduced in both circumstances.

As will be appreciated by one having ordinary skill in the art, some examples disclosed herein may be embodied as a system, method, or computer program product. Accordingly, aspects may take the form of an entirely hardware embodiment, an entirely software embodiment (including firmware, resident software, micro-code, etc.), or a combination of software and hardware aspects. Furthermore, aspects may take the form of a computer program product embodied in one or more non-transitory computer readable storage medium(s) having computer readable program instruction code embodied thereon. A computer readable storage medium may be or include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Computer program instruction code for carrying out operations for aspects described herein may be written in any combination of one or more programming languages, including an object oriented programming language such as Java, Smalltalk, C++ or the like and conventional procedural programming languages, such as the C programming language or similar programming languages. The program instruction code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various examples have been described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instruction code. These computer program instruction code may be provided to a processor of a general purpose computer, special purpose computer, or other programmable data processing apparatus to produce a machine, such that the program instruction code, which execute via the processor of the computer or other programmable data processing apparatus, create means for implementing the functions/acts specified in the flowchart and/or block diagram block or blocks.

These computer program instruction code may also be stored in a computer readable medium that can direct a computer, other programmable data processing apparatus, or other devices to function in a particular manner, such that the program instruction code stored in the computer readable medium produce an article of manufacture including program instruction code which implement the function/act specified in the flowchart and/or block diagram block or blocks.

The computer program instruction code may also be loaded onto a computer, other programmable data processing apparatus, or other devices to cause a series of operational steps to be performed on the computer, other programmable apparatus or other devices to produce a computer implemented process such that the program instruction code which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various examples. In this regard, each block in the flowchart or block diagrams may represent a module, segment, or portion of program instruction code, which comprises one or more executable program instruction code for implementing the specified logical function(s). In some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer program instruction code.

While the foregoing is directed to specific examples, other and further examples may be devised without departing from the basic scope thereof, and the scope thereof is determined by the claims that follow.

What is claimed is:

1. A design system comprising:
a processor; and
a memory coupled to the processor, the memory storing instruction code, the processor being configured to execute the instruction code to:
compile an application to generate a boot image file, the boot image file being capable of being loaded onto and executed by a programmable device, the programmable device comprising data processing engines (DPEs) and at least one of a processing system, programmable logic region, and a Network-on-Chip, wherein the boot image file has a format comprising:
a platform loader and manager comprising executable code capable of being executed by a controller of the programmable device; and
partitions, each of the partitions comprising a bitstream, executable code, data, or a combination thereof to be loaded onto the programmable device, the partitions including first partitions capable of being loaded onto one or more of the at least one of the processing system, the programmable logic region, and the Network-on-Chip of the programmable device, and the partitions collectively including a single global partition, the single global partition comprising DPE partitions and a DPE global header associated with each of the DPE partitions, the DPE partitions being capable of being loaded onto one or more of the DPEs of the programmable device, the controller by execution of the platform loader and manager being capable of loading the partitions onto the programmable device.

2. The design system of claim 1, wherein the format further comprises partition headers, each of the partition headers being associated with a corresponding one of the partitions, each of the partition headers including a parameter indicating on which subsystem of the programmable device the corresponding one of the partitions is to be loaded.

3. The design system of claim 1, wherein the format further comprises partition headers, each of the partition headers being associated with a corresponding one of the partitions, each of the partition headers including an attribute indicating whether the corresponding one of the partitions is encrypted.

4. The design system of claim 1, wherein the single global partition comprises DPE partition headers, each of the DPE partition headers being associated with a corresponding one of the DPE partitions and including respective parameters indicating an address and a length of the corresponding one of the DPE partitions.

5. The design system of claim 1, wherein the DPE global header comprises a parameter indicating a number of the DPE partitions included in the single global partition.

6. The design system of claim 1, wherein the format further comprises authentication certificates associated with the partitions, each of the authentication certificates being associated with a corresponding one of the partitions.

7. The design system of claim 1, wherein the format further comprises:
a header table;
a header authentication certificate associated with the header table;
image headers, the header table including respective parameters indicating a number of the image headers and an offset of at least one of the image headers;
partition headers, each of the image headers being associated with one or more of the partition headers, each of the partition headers being associated with a corresponding one of the partitions, each of the partition headers including respective parameters indicating an offset and a length of the corresponding one of the partitions; and
authentication certificates associated with the partitions, each of the authentication certificates being associated with a corresponding one of the partitions.

8. The design system of claim 1, wherein:
a first one or more of the first partitions are capable of being loaded onto the programmable logic region of the programmable device; and
a second one or more of the first partitions are capable of being loaded onto the processing system of the programmable device.

9. A method for operating a programmable device, the method comprising:
loading partitions of a boot image file onto the programmable device, wherein:
the programmable device comprises data processing engines (DPEs) and at least one of a processing system, programmable logic region, and a Network-on-Chip;
each of the partitions of the boot image file comprises a bitstream, executable code, data, or a combination thereof;
the partitions include first partitions capable of being loaded onto one or more of the at least one of the processing system, the programmable logic region, and the Network-on-Chip of the programmable device;
the partitions collectively include a single global partition, the single global partition comprising DPE partitions and a DPE global header associated with each of the DPE partitions; and
the DPE partitions are loaded onto one or more of the DPEs of the programmable device.

10. The method of claim 9 further comprising loading a platform loader and manager of the boot image file onto the programmable device by a controller, wherein loading the partitions is by execution of the platform loader and manager by the controller.

11. The method of claim 9 further comprising operating the one or more of the DPEs based on the DPE partitions loaded on the one or more of the DPEs.

12. The method of claim 9, wherein:
each of the partitions has an associated authentication certificate; and
loading the partitions includes, for each of the partitions, authenticating the authentication certificate of the respective partition.

13. The method of claim 9, wherein:
one or more of the partitions are encrypted; and
loading the partitions includes decrypting the one or more of the partitions.

14. The method of claim 9, wherein: the boot image file includes: a header table; a header authentication certificate associated with the header table; image headers, the header table including respective parameters indicating a number of the image headers and an offset of at least one of the image headers; partition headers, each of the image headers being associated with one or more of the partition headers, each of the partition headers being associated with a corresponding one of the partitions, each of the partition headers including respective parameters indicating (i) an offset of the corresponding one of the partitions, (ii) a length of the corresponding one of the partitions, (iii) on which subsystem of the programmable device the corresponding one of the partitions is to be loaded, and (iv) whether the corresponding one of the partitions is encrypted; and authentication certificates associated with the partitions, each of the authentication certificates being associated with a corresponding one of the partitions; and the single global partition comprises: DPE partition headers, each of the DPE partition headers being associated with a corresponding one of the DPE partitions and including respective parameters indicating an address and a length of the corresponding one of the DPE partitions, wherein the DPE global header comprises a parameter indicating a number of the DPE partitions included in the single global partition.

15. The method of claim 9, wherein:
a first one or more of the partitions are loaded onto the programmable logic region of the programmable device; and
a second one or more of the partitions are loaded onto the processing system of the programmable device.

16. A non-transitory storage medium comprising:
a boot image file capable of being loaded onto and executed by a programmable device, the programmable device comprising data processing engines (DPEs) and at least one of a processing system, programmable logic region, and a Network-on-Chip, wherein the boot image file comprises:

a platform loader and manager comprising executable code capable of being executed by a controller of the programmable device; and partitions, each of the partitions comprising a bitstream, executable code, data, or a combination thereof to be loaded onto the programmable device, the partitions including first partitions capable of being loaded onto one or more of the at least one of the processing system, the programmable logic region, and the Network-on-Chip of the programmable device, and the partitions collectively including a single global partition, the single global partition comprising DPE partitions, the DPE partitions being capable of being loaded onto one or more of the DPEs of the programmable device, the controller by execution of the platform loader and manager being capable of loading the partitions onto the programmable device.

17. The non-transitory storage medium of claim 16, wherein the boot image file further comprises partition headers, each of the partition headers being associated with a corresponding one of the partitions, each of the partition headers including respective parameters indicating on which subsystem of the programmable device the corresponding one of the partitions is to be loaded and whether the corresponding one of the partitions is encrypted.

18. The non-transitory storage medium of claim 16, wherein the single global partition comprises:

DPE partition headers, each of the DPE partition headers being associated with a corresponding one of the DPE partitions and including respective parameters indicating an address and a length of the corresponding one of the DPE partitions, wherein the DPE global header comprising a parameter indicating a number of the DPE partitions included in the single global partition.

19. The non-transitory storage medium of claim 16, wherein the boot image file further comprises authentication certificates associated with the partitions, each of the authentication certificates being associated with a corresponding one of the partitions.

20. The non-transitory storage medium of claim 16, wherein the boot image file includes:
  a header table;
  a header authentication certificate associated with the header table;
  image headers, the header table including respective parameters indicating a number of the image headers and an offset of at least one of the image headers;
  partition headers, each of the image headers being associated with one or more of the partition headers, each of the partition headers being associated with a corresponding one of the partitions, each of the partition headers including respective parameters indicating (i) an offset of the corresponding one of the partitions, (ii) a length of the corresponding one of the partitions, (iii) on which subsystem of the programmable device the corresponding one of the partitions is to be loaded, and (iv) whether the corresponding one of the partitions is encrypted; and
  authentication certificates associated with the partitions, each of the authentication certificates being associated with a corresponding one of the partitions; and the single global partition comprises:
  DPE partition headers, each of the DPE partition headers being associated with a corresponding one of the DPE partitions and including respective parameters indicating an address and a length of the corresponding one of the DPE partitions, wherein the DPE global header comprising a parameter indicating a number of the DPE partitions included in the single global partition.

* * * * *